Sept. 29, 1959   H. J. SCHLAFLY, JR   2,906,168
SLIDE PROJECTOR
Filed June 22, 1955

INVENTOR
Hubert J. Schlafly Jr.
BY
ATTORNEYS

United States Patent Office
2,906,168
Patented Sept. 29, 1959

2,906,168
SLIDE PROJECTOR

Hubert J. Schlafly, Jr., Hollis, N.Y., assignor to Teleprompter Corporation, New York, N.Y., a corporation of New York Application June 22, 1955, Serial No. 517,133

1 Claim. (Cl. 88—27)

This invention relates to slide projectors, and more particularly to slide projector apparatus which can be remotely controlled with respect both to the changing of slides and changing of the intensity of slide illumination. The invention provides a slide projector and a remote control unit therefor by means of which the brightness of the projected image may be continuously varied, and by means of which slide change commands may be given, either manually or automatically, for transmission to the projector.

The invention will be described in terms of a preferred embodiment illustrated in the accompanying drawings in which Fig. 1 is a front elevation of the control unit of the invention;

Figure 1:
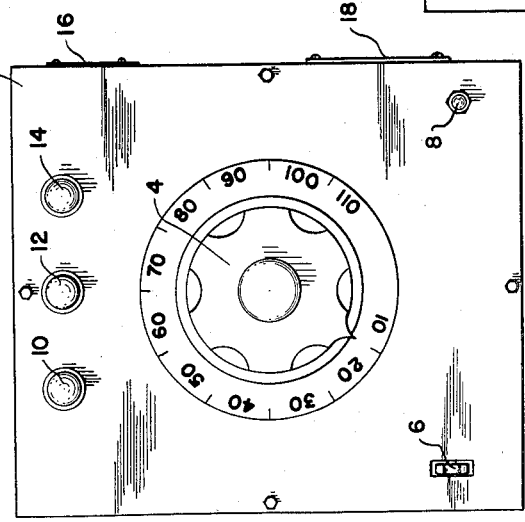

In Fig. 1 a casing or housing 2 encloses a variable transformer by means of which the brightness of illumination in the associated slide projector may be remotely controlled, together with switches for control of the entire apparatus and for the transmission of slide change commands. A control 4 is effective to continuously vary the output voltage of the transformer. A toggle switch 6 controls the application of power to the unit and thereby to the slide projector. A push button switch 8 also operable from the front panel of housing 2 initiates slide change commands. The application of power to the primary winding of the transformer is indicated at a first indicator lamp 10. A second indicator lamp 12 indicates by the intensity of its illumination the relative magnitude of the transformer secondary voltage and hence the brightness with which the slide is projected onto a viewing screen by the projector. A third indicator lamp 14 indicates the progress of the slide changing process at the projector, as will be more fully explained hereinafter.

Figure 2:
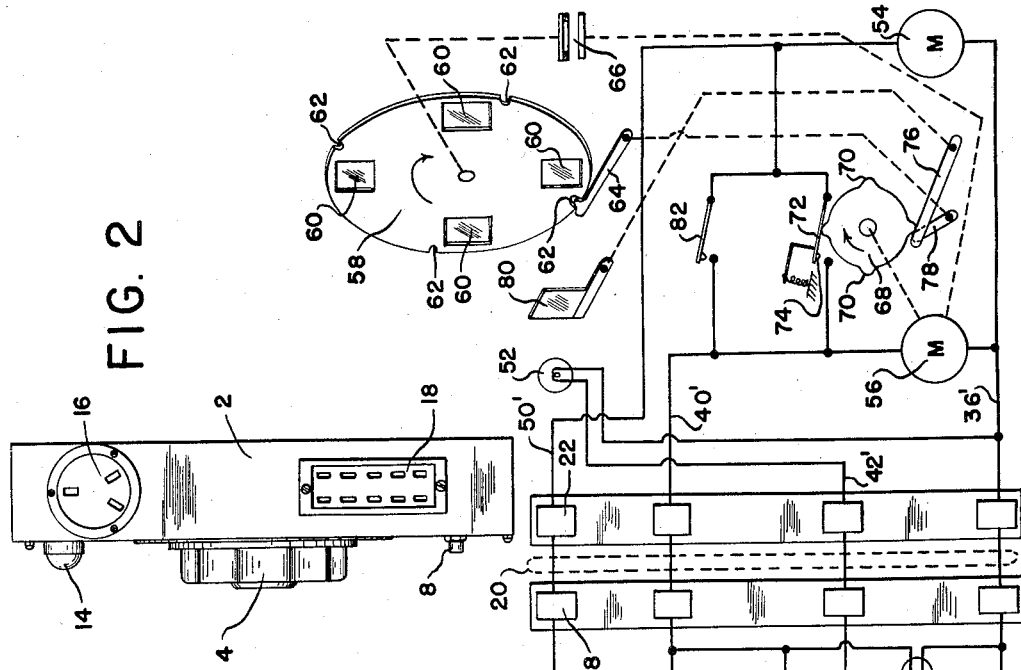
Fig. 2 is a side elevation of the unit illutrated in Fig. 1.

The unit of Fig. 1 is shown in side elevation in Fig. 2. A three-terminal receptacle 16 is provided for supply to the control unit of power destined for the slide projector to be controlled, and a multi-terminal connector 18 serves to connect, by a suitable cable, the control unit of Figs. 1 and 2 with the slide projector. The unit may be energized at receptacle 16 from an alternating current lighting circuit.

Figure 3:
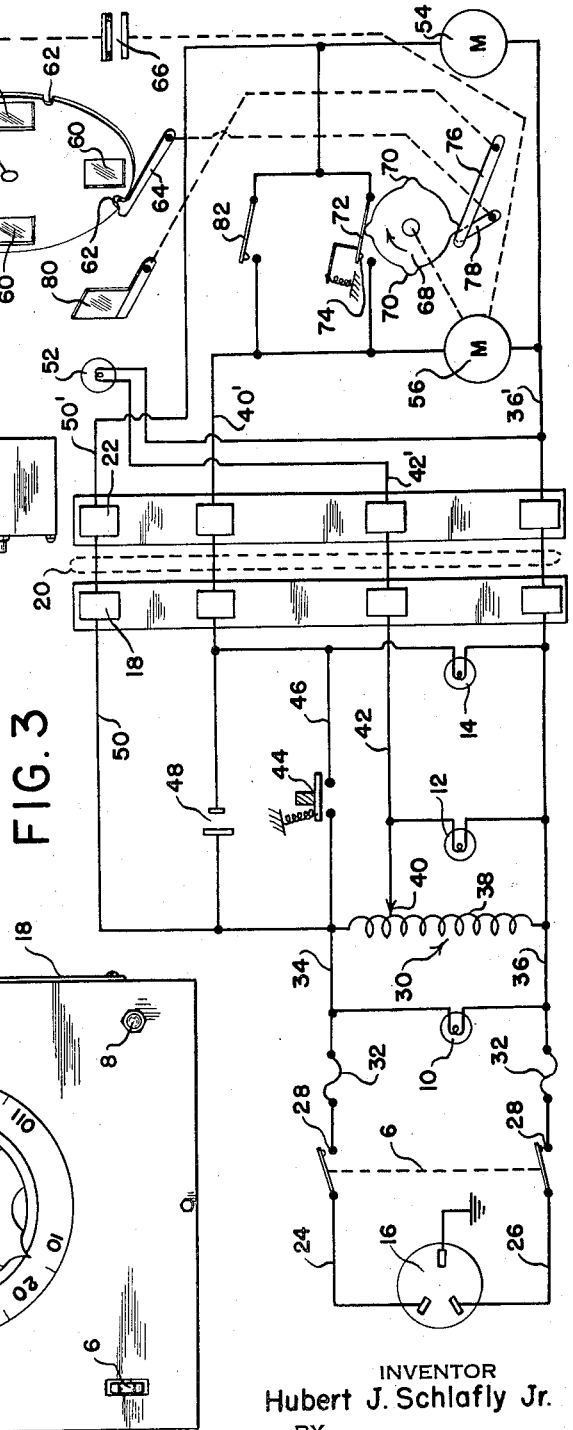
Fig. 3 is a schematic wiring diagram of the unit of Figs. 1 and 2, shown in association with a slide projector according to the invention, also schematically illustrated.

Referring to Fig. 3, the circuit of the control unit illustrated in Figs. 1 and 2 is shown schematically in association with the slide projector of the invention which it controls, the two being connected together by a cable 20 which joins connector 18 on the control unit with a connector 22 on the projector. In Fig. 3 the power input receptacle 16 connects via two conductors 24 and 26 to the switch 6, shown as a double pole switch, across whose output terminals 28 there is connected via fuses 32 an indicator lamp 10. Illumination of lamp 10 accordingly indicates a closed condition for switch 6 and the application of power to the transformer generally indicated at 30. The receptacle 16 is polarized and the cable which feeds it, while forming no part of the invention and therefore not shown, may advantageously be so wired that conductor 24 in the control unit of the invention becomes the active or hot conductor while conductor 26 is the A.C. common line at ground potential.

Contacts 28 further connect via fuses 32 and conductors 34 and 36 to the terminals of winding 38 of the transformer 30, shown as an autotransformer with its winding connected in parallel with the lamp 10. On winding 38 a tap 40 leads via a conductor 42 to one terminal in connector 18; the conductor 36 which is connected to the opposite end of winding 38 leading to another terminal in connector 18. The complete winding 38 therefore constitutes the primary of the transformer, and the portion thereof between tap 40 and conductor 36 constitutes the secondary thereof. The transformer output voltage thus appears between conductors 42 and 36, and across them is connected the indicator lamp 12, which by the brilliance of its illumination indicates the transformer output voltage. Conductor 34 leads to a push button switch 44 by means of which line voltage may be instantaneously applied to a conductor 46. Conductor 46 leads to a further terminal in connector 18, and the indicator lamp 14 is connected between it and the conductor 36. In parallel with switch 44 there is provided a two-terminal receptacle or connector 48 by means of which the function of the switch 44 may be fulfilled by a remotely located substitute. Accordingly line voltage is available between conductors 46 and 36 whenever push button 44 is closed and whenever connection is made across the terminals of receptacle 48. An additional conductor 50 supplies line voltage to a further terminal in connector 18 whenever the power switch 6 is closed.

The control unit coacts with the slide projector of the invention, the novel elements of which are shown in Fig. 3 to the right of cable 20 which connects the projector to the control unit. In the projector, a projector lamp 52 is connected between conductors 36' and 42' to which the transformer secondary voltage is applied by cable 20. Adjustment of the transformer control 4 (Fig. 1) to which tap 40 is mechanically linked for motion over the winding 38 therefore controls the illumination of lamp 52. The projector also includes a blower motor 54 for cooling the lamp 52 and a slide change motor 56. The blower motor 54 is connected between conductors 36' and 50', to which line voltage is applied via cable 20 from conductors 36 and 50 in the control unit whenever the power switch 6 is closed.

The slide change mechanism of the projector includes a wheel 58 having a plurality of frames 60 for the support of slides arranged therein. On the periphery of wheel 58 there is provided for each of the frames 60 a notch 62. A detent bar 64, fixedly pivoted with respect to the bearings for the slide change wheel 58, is arranged to engage the notches 62 successively as the wheel is rotated, the positioning of lamp 52 and of the bearings in which the wheel 58 rotates being such that upon engagement of the detent in each of the notches 62, the associated slide frame 60 is aligned with the projector lamp. In accordance with known constructions, a condenser lens may be provided to cast the illumination of lamp 52 onto the slide so positioned, and a projection lens may be provided to cast an image of the slide so illuminated onto a screen.

The slide changing mechanism is driven by the slide change motor 56, which is coupled via a friction clutch 66 and by reduction gearing not shown to the slide wheel 58. In addition, a cam wheel 68 is connected by reduction gearing to the motor 56. In the construction schematically illustrated in Fig. 3 cam wheel 68 includes four cams 70 on a common support so that cam followers engaging the wheel 68 will go through four cycles of motion for each rotation of the cam wheel. Similarly the slide change wheel is provided with four frames 60, the arrangement being such that the slide change wheel goes through one complete revolution for each revolution of the cam wheel 68.

A first cam follower 72 constitutes the actuating mechanism of a limit switch 74 presently to be described, which controls the application of voltage to the slide change motor between conductors 50' and 36'. Two additional cam followers 76 and 78 are arranged to engage the cams 70. The follower 76 is so proportioned, for example by reference to its pivot point in the frame of reference in which the wheel 68 turns, as to be lifted from its rest position earlier than cam follower 78 and to remain lifted until after follower 78 has returned to its rest position.

The follower 76 is linked to a shutter 80 so as to retractably interpose the latter between lamp 52 and the slide supporting wheel whenever follower 76 is lifted from its rest position. Follower 78 is linked to the detent bar 64 to lift the latter from its position of engagement with the notches 62 when follower 78 is lifted from its rest position on the wheel 68.

In the position of rest during the projection of a slide onto the screen, follower 72 is raised by one of the cams 70 from its rest position on wheel 68 to open switch 74 so that power is removed from the slide change motor except as it may be continuously applied thereto by a hand-operated switch 82 arranged in parallel with switch 74, if continuous changing of slides is to be provided for. Assuming however switch 82 to be absent or open, upon closing of push button switch 44 or alternative application of power to conductor 46, the motor 56 will be energized and the cam wheel 68 will begin to rotate. Switch 74 is of the microswitch type so that the minimum rotation of motor 56 caused by a momentary closing of switch 44 is sufficient to allow switch 74 to close, providing a circuit for motor 56 via conductor 50'. Shortly thereafter follower 76 is engaged by one of the cams on cam wheel 68 to interpose shutter 80 between the lamp and the slide. The projection of the slide is accordingly interrupted.

With slight additional rotation of the cam wheel 68 follower 78 is engaged to lift the detent bar 64 from the slide change wheel. The friction clutch 66 is accordingly made effective to rotate wheel 58. For a slide change wheel having four frames and a cam wheel having four cams thereon, the linkages between the cam wheel, its cam followers and the detent bar and shutter, and the friction drive to the slide change wheel are so proportioned that in something less than 45° of rotation of the cam wheel the shutter 80 is first interposed in the patch of the projection lamp, the detent bar is lifted from its notch, the slide change wheel is rotated through 90°, the detent bar is re-engaged with the next notch 62 and the shutter is removed from the light path of the projection lamp. With the next slide thus projected onto the screen, the cam wheel continues to rotate with motor 56 without effect on the slide projected onto the screen until follower 72 is raised to open switch 74 whereupon the slide change motor stops. As long as voltage is applied to the slide change motor 56 the lamp 14 is illuminated, indicating at the remote position of the control unit of Figs. 1 and 2 that the slide changing process is incomplete and that no slide is being projected onto the screen.

The projector may of course however be constructed with a different number of frames in the slide change wheel and with a different number of cams on the cam wheel, these two numbers being not necessarily the same. The cam followers 72, 76 and 78 may engage the same or different cams on the cam wheel, if plural cams are provided thereon.

Various other departures may be made from the particular structure shown and described herein, the scope of the invention being set forth in the appended claim.

I claim:

A remotely controlled slide projector comprising a lamp, means to hold a plurality of slides successively positionable adjacent said lamp, a detent releasably engaging said means in a plurality of positions, a shutter retractably positionable between said lamp and means, a motor frictionally coupled to said means, cam means coupled to said motor, a first follower engaging said cam means to open a switch in circuit with said motor, a second follower engaging said cam means to position said shutter between said lamp and first-named means, a third follower engaging said cam means to disengage said detent from said first-named means, and remotely positioned means to continuously alter the energization of said lamp and to short-circuit said switch when open.

References Cited in the file of this patent

UNITED STATES PATENTS

| | | |
|---|---|---|
| 2,146,452 | Spindler | Feb. 7, 1939 |
| 2,227,071 | Dilks | Dec. 31, 1940 |
| 2,260,660 | Darwin | Oct. 28, 1941 |
| 2,299,973 | Getten | Oct. 27, 1942 |
| 2,407,902 | Pratt | Sept. 17, 1946 |
| 2,537,429 | Seyler | Jan. 9, 1951 |
| 2,560,390 | Gruenhut | July 10, 1951 |
| 2,635,216 | Hobbs | Apr. 14, 1953 |